(12) United States Patent
Schmitt et al.

(10) Patent No.: US 12,337,740 B2
(45) Date of Patent: Jun. 24, 2025

(54) GUIDING DEVICE FOR A HEADREST OF A VEHICLE SEAT AND GUIDING SYSTEM

(71) Applicant: GRAMMER AG, Ursensollen (DE)

(72) Inventors: Sebastian Schmitt, Nuremberg (DE); Gerd Truckenbrodt, Weiden (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/873,471

(22) Filed: Jul. 26, 2022

(65) Prior Publication Data

US 2023/0034218 A1 Feb. 2, 2023

(30) Foreign Application Priority Data

Jul. 28, 2021 (DE) ...................... 10 2021 119 622.1

(51) Int. Cl.
*B60N 2/809* (2018.01)
*B60N 2/812* (2018.01)
*B60N 2/815* (2018.01)

(52) U.S. Cl.
CPC ............. *B60N 2/812* (2018.02); *B60N 2/809* (2018.02); *B60N 2/815* (2018.02)

(58) Field of Classification Search
CPC ........ B60N 2/897; B60N 2/809; B60N 2/812; B60N 2/815
USPC ...................................................... 297/410
See application file for complete search history.

(56) References Cited

U.S. PATENT DOCUMENTS

| | | | | |
|---|---|---|---|---|
| 6,062,645 A | * | 5/2000 | Russell | B60N 2/818 297/410 |
| 2010/0194167 A1 | * | 8/2010 | Gans | B60N 2/818 297/410 |
| 2011/0025116 A1 | * | 2/2011 | Ledieu | B60N 2/818 297/391 |
| 2014/0361595 A1 | * | 12/2014 | Weiland | B60N 2/844 297/410 |
| 2017/0246971 A1 | | 8/2017 | Hagan | |
| 2019/0143865 A1 | * | 5/2019 | Hagan | F16C 29/005 297/410 |
| 2021/0213860 A1 | * | 7/2021 | Nagi | B60N 2/815 |
| 2023/0031120 A1 | * | 2/2023 | Schmitt | B60N 2/888 |
| 2023/0035161 A1 | * | 2/2023 | Schmitt | B60N 2/897 |
| 2023/0071448 A1 | * | 3/2023 | Bivens | B60N 2/809 |
| 2023/0104605 A1 | * | 4/2023 | Schmitt | B60N 2/897 297/391 |
| 2024/0092242 A1 | * | 3/2024 | Imamura | B60N 2/818 |

FOREIGN PATENT DOCUMENTS

| | | | | |
|---|---|---|---|---|
| FR | 3005006 A1 | * | 10/2014 | |
| FR | 3017834 A1 | * | 8/2015 | ........... B60N 2/5841 |
| GB | 2357032 A | * | 6/2001 | ............. B60N 2/815 |

* cited by examiner

*Primary Examiner* — Robert Canfield
(74) *Attorney, Agent, or Firm* — LUCAS & MERCANTI, LLP; Klaus P. Stoffel

(57) ABSTRACT

A guide device for a headrest with a guide structure for supporting and guiding an end region of a holding rod and with a trim part for covering an edge region of an opening for the passage of the holding rod in a cushion, wherein the holding rod can be releasably locked by a latch device in at least one position relative to the guide structure. The guide device includes the trim part and the guide structure, wherein the trim part has first fastening components which are engageable with second fastening components of the guide structure.

7 Claims, 3 Drawing Sheets

Fig. 3
Fig. 4
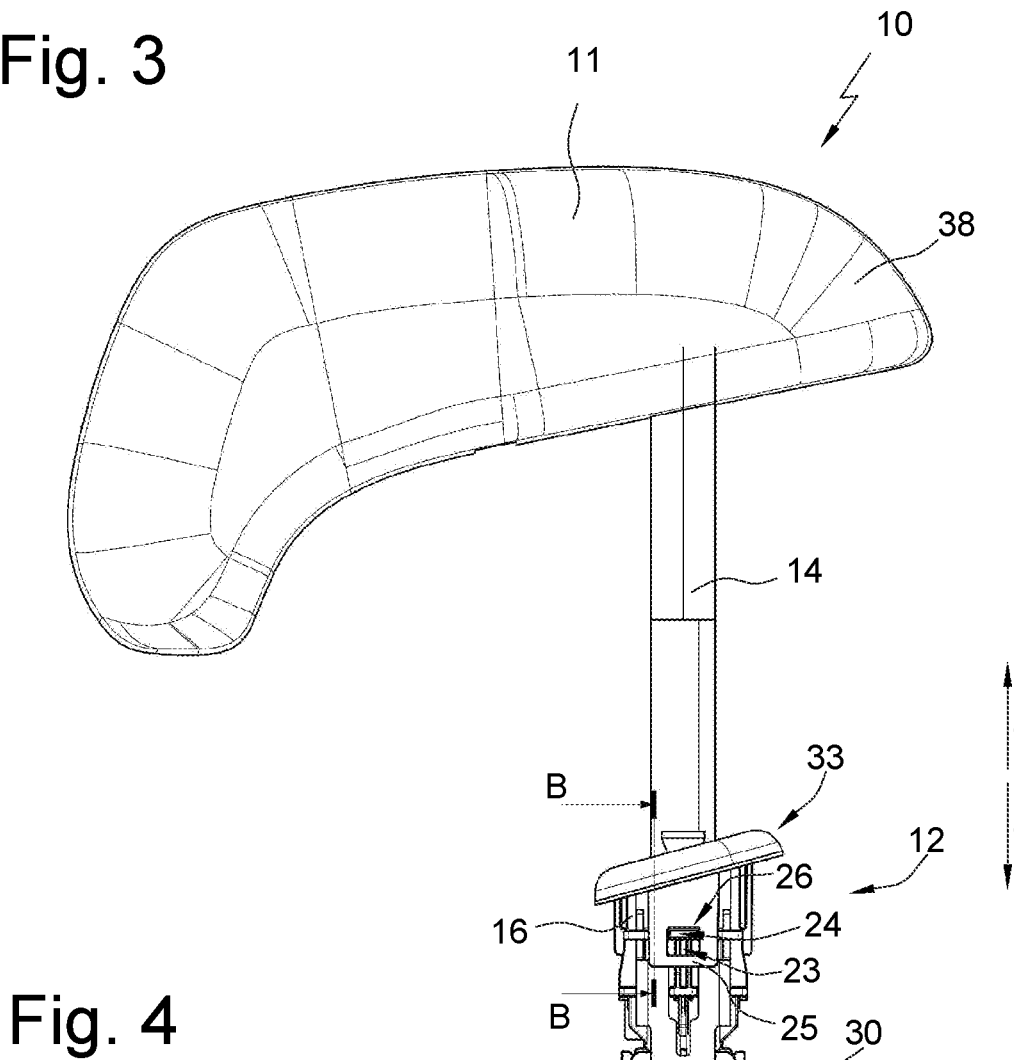
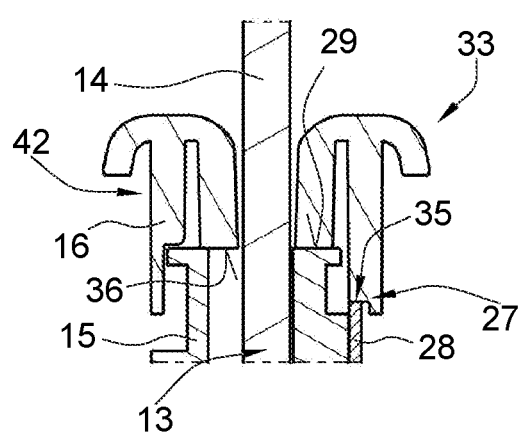

GUIDING DEVICE FOR A HEADREST OF A VEHICLE SEAT AND GUIDING SYSTEM

CROSS-REFERENCE TO RELATED APPLICATIONS

The present application which claims priority of DE 10 2021 119 622.1, filed Jul. 28, 2021, the priority of the application is hereby claimed and this application is incorporated herein by reference.

BACKGROUND OF THE INVENTION

According to a first aspect, the invention relates to a guide device for a headrest.

Such a guide device is known from public prior use. It has a guide structure that is supported in a receptacle of a seat structure of a vehicle seat. At an upper end region of the guide structure, a trim part could be fastened in order to cover an edge region of a cushion opening through which the holding rod engages.

In the prior art, the guide structure and the trim part often had a different design depending on the different installation conditions, because the guide structure extended to a surface of the cushion that was to be covered by the trim part. There were also differences in relation to the angle between a center axis of the guide structure and the extent of the surface of the cushion. In the prior art, for adaptions to be made, the entire guide structure had to be changed.

SUMMARY OF THE INVENTION

The problem addressed by the invention was that of creating a guide device for which the effort for adaption to different installation circumstances is lower.

The guide device comprises a guide structure for supporting and guiding a holding rod. The guide structure is arranged in a mount seat of a receptacle that is held on the seat structure. With regard to the longitudinal center axis, the guide structure has a defined length. The guide device has a trim part. This serves to cover an edge region of an opening for the passage of the holding rod in a seat cushion.

The trim part has a collar having a contact surface for supporting on the cushion and a guide region that forms part of a guide channel for guiding the holding rod. Another part of the guide channel is formed by the guide structure. Depending on the inclination of the upper side of the seat back on which the headrest is supported, the collar must also have a corresponding inclination in relation to a longitudinal axis of the guide structure. Furthermore, on different vehicles, the spacing between an upper end of the guide structure and the upper side of the seat back is different, and therefore the guide region is to be adjusted.

The guide structure has a constant length and is configured such that when arranged in the mount seat under normal installation conditions, the adaption to the installation dimensions can take place by means of the trim part.

The holding rod is releasably lockable by means of a latch device in at least one position relative to the guide structure.

The trim part has fastening means which are engageable with counterpart fastening means of the guide structure. In all variants, the fastening means are adapted to the conditions of the vehicle such that they are in target position with respect to the counterpart fastening means.

With the features according to the invention, it is possible to always use the same guide structure and merely adjust the trim part to the requirements of the respective vehicle. The effort for adaptation for adapting the guide device to the dimensions of the respective vehicle is therefore considerably lower.

The trim part is e.g. a component of an actuation device by means of which the latch device is adjustable between a latching position, in which the holding rod is locked with respect to at least one direction, and a release position, in which the holding rod is movable. The trim part is movable e.g. under elastic deformation of the cushion relative to the guide structure in the direction of the longitudinal axis of the guide structure.

In the non-actuated position of the actuation device, the latch device is arranged in a latching position, and in an actuated position, the latch device is arranged in a release position.

The trim part has e.g. support surfaces that cooperate with the guide surfaces of the guide structure in order to adjust the actuation device between the non-actuated position and the actuated position. When the trim part is adapted, the support surfaces are adapted such that they are in a target position with respect to the guide surfaces. If the operating part is a component of the actuating device, the fastening means and counterpart means are for example configured such that they permit a relative movement with respect to one another. For example one of the guide structure and trim part parts has an opening in which a projection of the other part can move.

The trim part has e.g. an actuation lug that cooperates with an actuation element of the actuation device in order to move the actuation device between the non-actuated position and the actuated position. On the adapted trim part, the actuation lug is adapted such that it is in target position with respect to the actuation part with which it cooperates.

According to a second aspect, the invention relates to a guide system for a headrest. With regard to the prior art, reference is made to the statements about the first aspect. The object of by the invention was that of creating a guide for a holding rod of a headrest, for which guide the effort for adapting to the installation conditions in different vehicles is lower.

The guide system comprises a guide structure for supporting and guiding a holding rod. The guide structure is supported in a mount seat of a receptacle that is fastened to the seat structure. The guide system further comprises at least one trim part. The trim part serves to cover an edge region of an opening for the passage of the holding rod in a cushion. The holding rod is releasably lockable by means of a latch device in at least one position relative to the guide structure.

The trim part has fastening means which are engageable with counterpart fastening means of the guide structure. From a set of different trim parts, one can be selected and connected to the guide structure. The fastening means of the trim part are adapted to the installation dimensions of the respective vehicle such that they are in the target position with respect to the counterpart fastening means.

To avoid repetitions, reference is also made to the first aspect with regard to the advantages of the invention.

Exemplary embodiments of the invention are described by way of example in the description of the drawings below, also with reference to the schematic drawings. For the sake of clarity—including insofar as different embodiments are concerned—identical or comparable parts or elements or regions are labeled with the same reference characters, sometimes with the addition of lower-case letters.

Within the framework of the invention, features that are described, shown or disclosed only in relation to one exemplary embodiment can also be provided for every other exemplary embodiment of the invention. Modified embodiments of this kind are within the scope of the invention, even if they are not shown in the drawings.

All disclosed features are per se essential to the invention. In the disclosure of the application, the disclosed content of the cited documents and of the described devices of the prior art is also included in its entirety, also for the purpose of including individual or multiple features of the subjects disclosed there in one or more claims of the present application. Such modified embodiments are also within the scope of the invention, even if they are not shown in the drawings.

BRIEF DESCRIPTION OF THE DRAWING

Shown are in.

DETAILED DESCRIPTION OF THE INVENTION

Figure 1:
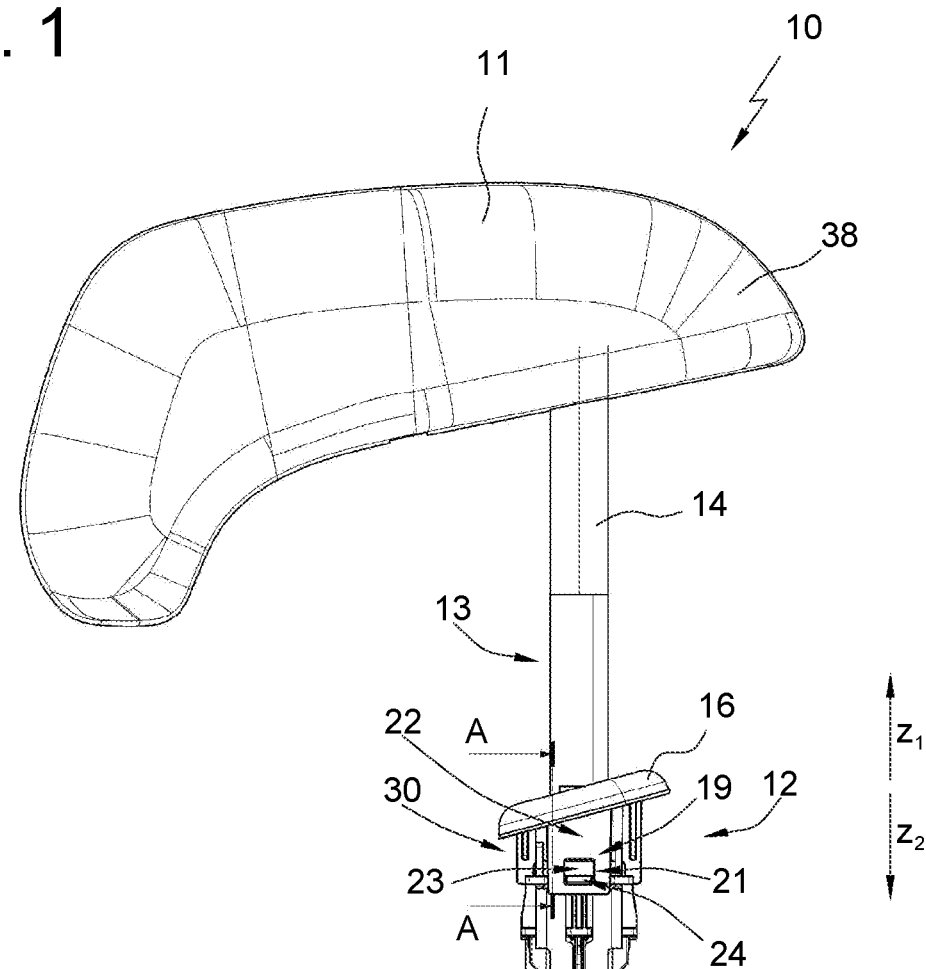
FIG. 1 a side view of the headrest device, wherein an actuation device for a latch device is in a non-actuated position FIG. 2 a sectional view as per section line A-A in FIG. 1, FIG. 3, in accordance with FIG. 1, a side view, wherein the actuation device is in an actuated position FIG. 4 a sectional view as per section line B-B in FIG. 3, FIG. 5 a side view of the headrest device, wherein a first trim part is connected to the guide structure, wherein a head part of the headrest is not shown, FIG. 6 a side view of the headrest device, wherein a second trim part is connected to the guide structure, wherein a head part of the headrest is not shown, FIG. 7 a side view of the headrest device, wherein a third trim part is connected to the guide structure, wherein a head part of the headrest is not shown.

A complete headrest device is shown in the drawings denoted with reference character 10.

The headrest device 10 comprises a headrest 11 and guide devices 12. The headrest 11 comprises a head part 38 and a holding device with at least one holding rod 14, more particularly with two holding rods 14, each having an end region 13. Instead of individual holding rods, the holding device can also comprise a holding rod bracket having two free end regions 13, which cooperate with the guide device 12. By means of the guide device 12, the end region 13 of the holding rod 14 can be supported on a vehicle structure, more particularly a seat structure.

The guide device 12 comprises a guide structure 15 and a trim part 16. The trim part 16 forms an opening 17 for introducing the end region 13 into a guide channel 18 which is formed by the trim part 16 and the guide structure 15. In the guide channel 18, the holding rod 14 is movable in the directions z1 and z2.

The guide device 12 comprises a latch device 20 which is adjustable between a latching position and a release position. In the latching position, a movement of the holding rod 14 is locked with respect to at least one of the directions z1 and z2. In the release position, the holding rod 14 is movable in the directions z1 and z2. The latch device 20 comprises a latch supported in a movable manner on the guide device, and comprises at least one locking structure in the holding rod 14. The latch and the locking structure are not shown in the drawings.

By means of an actuation device 30, the latch device 20 is movable between the latching position and the release position. The actuation device 30 has an operating part which in the present embodiment is formed by the trim part 16. For fastening on the guide structure 15, the trim part 16 has first fastening means 19 which are engageable with second fastening means 21 and permit a movement of the trim part 16 in the directions z1 and z2.

The trim part 16 has sliding surfaces 39 which are in contact with guide surfaces 41 of the guide structure 15 and permit a movement of the trim part 16 in the directions z1 and z2. In FIGS. 1 and 3 it can be seen that the trim part 16 is provided with a tab 22 on opposite sides for fastening on the guide structure 15, said tab having a cutout 23. In the cutout 23, a projection 24 of the guide structure 15 is arranged in order to hold the trim part 16 on the guide structure 15. The cutout 23 is configured such that the trim part 16 can move relative to the guide structure 15 in the directions z1 and z2. The projection 24 then moves within the cutout 23 between an end surface 25 and an end surface 26 of the cutout 23. The trim part 16 is loaded in direction z1 by a spring, not shown.

Figure 2:
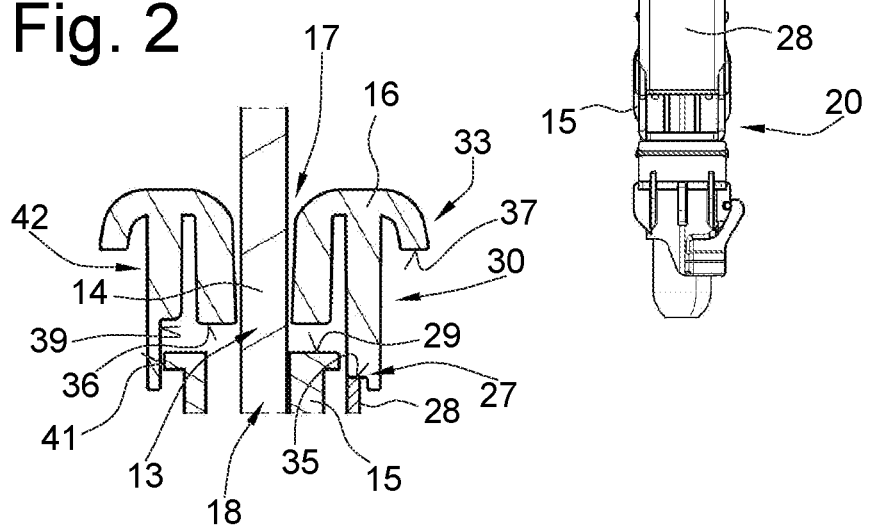

An actuation lug 27 of the trim part 16 is in contact with an actuation part 28 of the actuation device 30, with which actuation lug the latch of the latch device 20 is movable between the latching position and the release position. In FIGS. 1 and 2, the actuation device 30 is arranged in a non-actuated position. In FIGS. 3 and 4, the actuation device is shown in an actuated position.

In the non-actuated position, the projection 24 (see FIG. 1) is arranged at the end surface 25. According to FIG. 2, the actuation lug 27 is at an upper end region 35 of the actuation part 28. A spacing is formed between a stop surface 36 and an end surface 29 of the guide structure 29. In the actuated position according to FIG. 3, the projection 24 is arranged at the end region 26. The actuation lug 27 is in contact with the upper end region 35. The stop surface 36 rests against the end surface 29.

In the prior art, the guide device was configured such that if the spacing between an end surface 29 of the guide structure 15 and a surface 31 of the cushion 32, on which a collar 33 of the trim part 16 rests, was changed, the entire guide part had to be changed.

According to the invention, the guide structure 15—if it is fastened in a mount seat of a seat structure—has a defined position. To change the spacing to the surface 31, or the inclination of the collar 33, for different vehicle models, the invention proposes that the trim part 16 is adapted, in terms of its connection dimensions, to the guide structure 15 and the inclination of the collar 33. The guide part 15 remains unchanged.

Figure 5:
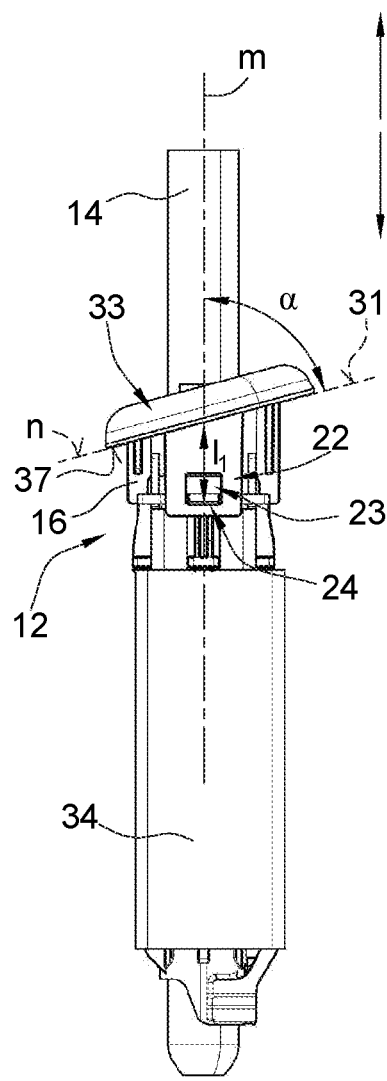
Figure 6:
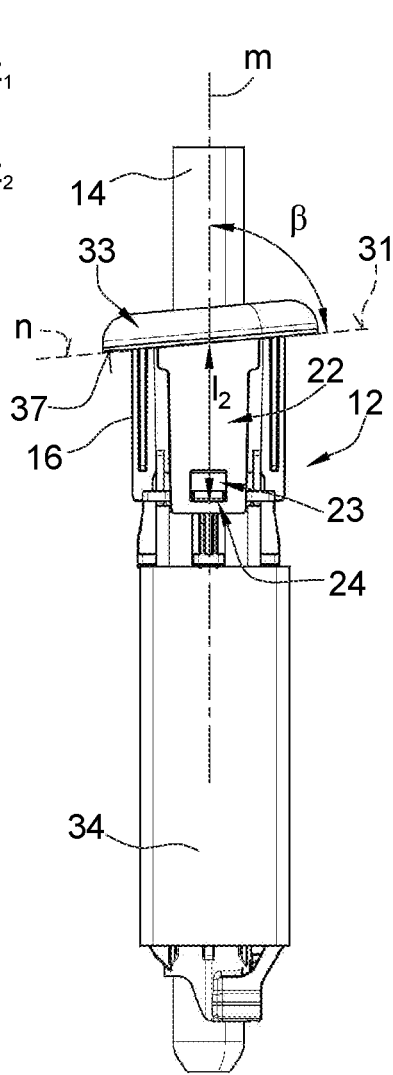
Figure 7:
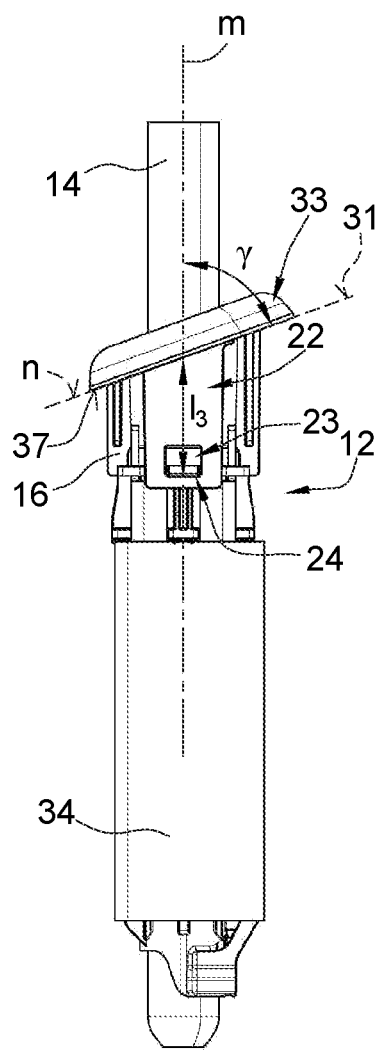

In FIGS. 5, 6 and 7, the guide device 12 is shown in different installation conditions, wherein the guide structure 15 supported in the receptacle 34 of the seat structure always has the same design, wherein however the trim part 16 differs. In all embodiments of FIGS. 5, 6 and 7, the actuation lug 27 is configured such that it is arranged in the target position with respect to the actuation part 28 when the actuation device 30 is non-actuated.

The trim part 16 shown in FIG. 5 has a length l1 between the end surface 25 of the cutout 23 and a contact surface 37 of the collar 33, which contact surface rests on the surface 31 of the cushion 32. The length l1 is formed on the center axis m. A longitudinal axis n in relation to the diameter of the collar 33 has an angle $\alpha$ to the center axis m.

On the trim part 16 shown in FIG. 6, with the same dimensioning as in FIG. 5, a length l2 is formed between the end surface 25 and a contact surface 37. Between the longitudinal axis n and the center axis m, an angle $\beta$ is formed, which differs from the angle $\alpha$.

The trim part 16 shown in FIG. 7 is provided with a length 13 between the end surface 25 and the contact surface 37. An angle γ between the longitudinal axis n and the center axis m differs from the angle α and the angle β.

It is clear that with the guide device 12 according to the invention, the same guide structure 15 can be combined with different trim parts 16 in order to adapt the guide device 12 to the installation conditions of the respective vehicle. The effort for adaption is reduced because only the trim part 16 has to be adapted.

The invention claimed is:

1. A guide device for a headrest comprising: a guide structure for supporting and guiding an end region of a holding rod; a trim part for covering an edge region of an opening for passage of the holding rod in a cushion; a latch device configured to releasably lock the holding rod in at least one position relative to the guide structure, wherein the trim part has first fastening means which are engageable with second fastening means of the guide structure; and an actuation device by which the latch device is adjustable between a latching position, in which the holding rod is locked with respect to at least one direction, and a release position, in which the holding rod is movable, wherein the actuation device includes an actuation lug formed by the trim part, the actuation lug being configured to move the latch device between the latching position and the release position.

2. The guide device according to claim 1, wherein the trim part has a guide region and a collar with a contact surface for support on the cushion.

3. The guide device according to claim 1, wherein the trim part has support surfaces that cooperate with guide surfaces of the guide structure.

4. The guide device according to claim 1, wherein the first fastening means and the second fastening means are configured to permit a relative movement with respect to one another.

5. The guide device according to claim 1, wherein the trim part has a cutout with support surfaces, wherein the support surfaces are in contact with guide surfaces of the guide structure.

6. The guide device according to claim 1, wherein the actuation lug cooperates with an actuation part of an actuation device in order to move the actuation device between a non-actuated position and an actuated position.

7. A guide device for a headrest, comprising: a guide structure for supporting and guiding a holding rod; at least one trim part for covering an edge region of an opening for the passage of the holding rod in a cushion; a latch device configured to releasably lock the holding rod in at least one position relative to the guide structure, wherein the trim part has first fastening means that are engageable with second fastening means of the guide structure, wherein the at least one trim part is included in a set of different trim parts from which the at least one trim part is selectable and subsequently connected to the guide structure; and an actuation device by which the latch device is adjustable between a latching position, in which the holding rod is locked with respect to at least one direction, and a release position, in which the holding rod is movable, wherein the actuation device includes an actuation lug formed by the trim part, the actuation lug being configured to move the latch device between the latching position and the release position.

* * * * *